United States Patent
Ovsiannikov et al.

(10) Patent No.: US 9,967,500 B2
(45) Date of Patent: May 8, 2018

(54) SYSTEMS AND METHODS OF SELECTIVE OUTPUT FOR REDUCING POWER

(71) Applicant: Samsung Electronics Co., Ltd., Suwon-si, Gyeonggi-do (KR)

(72) Inventors: Ilia Ovsiannikov, Studio City, CA (US); Hongyu Wang, San Gabriel, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 98 days.

(21) Appl. No.: 14/678,965

(22) Filed: Apr. 4, 2015

(65) Prior Publication Data
US 2016/0094768 A1    Mar. 31, 2016

Related U.S. Application Data

(60) Provisional application No. 62/057,207, filed on Sep. 29, 2014.

(51) Int. Cl.
*H04N 5/355* (2011.01)
*H04N 5/378* (2011.01)

(52) U.S. Cl.
CPC .................. *H04N 5/378* (2013.01)

(58) Field of Classification Search
CPC .... H04N 5/3692; H04N 5/2351; H04N 5/376; H04N 5/3698; H04N 5/37452; H04N 19/00; H04N 5/23238; H03M 7/30
USPC ................... 382/293, 232; 348/36
See application file for complete search history.

(56) References Cited

U.S. PATENT DOCUMENTS

| | | | |
|---|---|---|---|
| 6,483,532 B1* | 11/2002 | Girod | H04N 7/142 348/14.12 |
| 7,230,650 B2* | 6/2007 | Okamoto | H04L 1/0065 348/423.1 |
| 8,633,845 B2 | 1/2014 | Standley | |
| 8,781,791 B2 | 7/2014 | Panther et al. | |
| 2005/0231620 A1 | 10/2005 | Fraenkel et al. | |
| 2009/0109306 A1* | 4/2009 | Shan | H04N 5/235 348/273 |
| 2010/0026867 A1* | 2/2010 | Matsufuji | H04N 5/378 348/308 |
| 2010/0182468 A1* | 7/2010 | Posch | H04N 5/335 348/294 |
| 2011/0074968 A1 | 3/2011 | Kim et al. | |
| 2012/0096330 A1* | 4/2012 | Przybylski | G06F 11/1072 714/763 |
| 2013/0222532 A1* | 8/2013 | Kamiya | G06T 3/0062 348/36 |
| 2013/0229521 A1* | 9/2013 | Siecke | G06K 9/00825 348/148 |
| 2014/0009648 A1 | 1/2014 | Kim et al. | |

(Continued)

*Primary Examiner* — Xi Wang
(74) *Attorney, Agent, or Firm* — Renaissance IP Law Group LLP

(57) ABSTRACT

An embodiment includes a system, comprising: a buffer configured to store a plurality of events, each event including a plurality of bits; an output circuit configured to output events from the buffer; and a controller coupled to the buffer and the output circuit and configured to: cause the output circuit to output a first event from the buffer; and select a second event from the buffer to be output by the output circuit after the first event based on bits associated with the first event.

13 Claims, 7 Drawing Sheets

(56) References Cited

U.S. PATENT DOCUMENTS

| | | | | |
|---|---|---|---|---|
| 2014/0009650 A1* | 1/2014 | Kim | ............... | H04N 5/335 |
| | | | | 348/294 |
| 2014/0336848 A1* | 11/2014 | Saund | ............... | G08G 1/054 |
| | | | | 701/3 |
| 2014/0354537 A1* | 12/2014 | Park | ............... | G06F 3/017 |
| | | | | 345/156 |
| 2014/0363049 A1* | 12/2014 | Benosman | ......... | G06K 9/00771 |
| | | | | 382/103 |

\* cited by examiner

SYSTEMS AND METHODS OF SELECTIVE OUTPUT FOR REDUCING POWER

CROSS-REFERENCE TO RELATED APPLICATION

This application claims the benefit of U.S. Provisional Patent Application No. 62/057,207, filed Sep. 29, 2014, which is hereby incorporated by reference herein, in its entirety, for all purposes.

BACKGROUND

This disclosure relates to systems and methods of selective output for reducing power.

A dynamic vision sensor (DVS) may be capable of sensing a change in illumination of a pixel. These changes may be output as events indicating the change. Although the events may be output individually and not as frame or image, the events may be output in a temporal order. That is, the events may be output in the order the changes in the illumination were sensed by the pixels.

SUMMARY

An embodiment includes a system, comprising: a buffer configured to store a plurality of events, each event including a plurality of bits; an output circuit configured to output events from the buffer; and a controller coupled to the buffer and the output circuit and configured to cause the output circuit to output a first event from the buffer; and select a second event from the buffer to be output by the output circuit after the first event based on the values of bits associated with the first event.

An embodiment includes a system, comprising: a buffer configured to store a plurality of events; an output circuit configured to output events in the buffer; and a controller coupled to the buffer and the output circuit and configured to order a sequential output of the events through the output circuit based on adjacent events.

An embodiment includes a method, comprising: storing a plurality of events in a buffer, each event being associated with a corresponding plurality of bits; outputting a first event of the events in the buffer; selecting a second event of the events in the buffer to output based on the first event; and outputting the second event.

DETAILED DESCRIPTION

Figure 1:
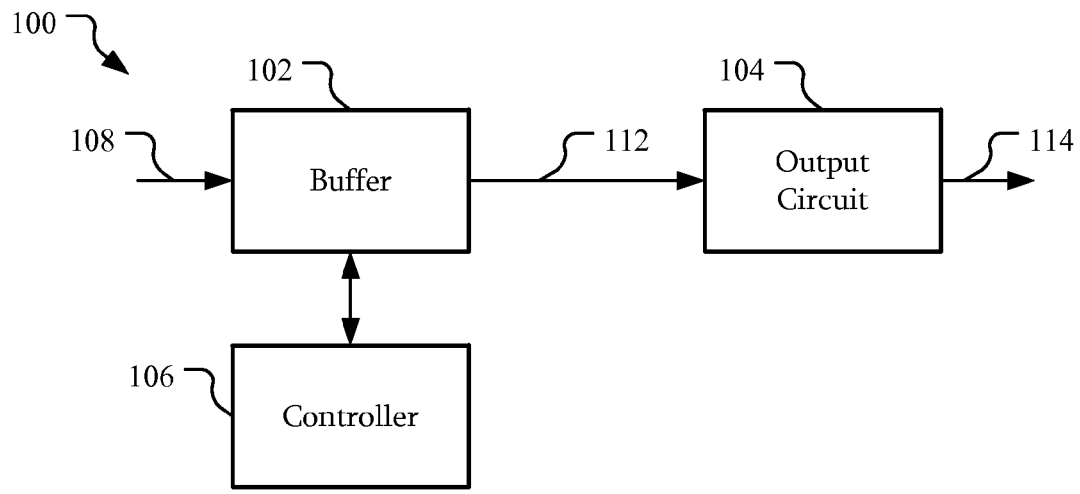
FIG. 1 is a schematic view of an output system according to an embodiment.

The embodiments relate to systems and methods of selective output for reducing power. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as an embodiment", one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the methods and systems operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular systems and devices having certain components. One of ordinary skill in the art will understand that in other embodiments, systems and devices may have other and/or additional components and/or other features. However, one of ordinary skill in the art will readily recognize that the methods and systems are consistent with other structures. Methods and systems may also be described in the context of single elements. However, one of ordinary skill in the art will readily recognize that the methods and systems are consistent with the use of systems and devices having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to examples containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of an output system according to an embodiment. In this embodiment, a system 100 includes a buffer 102, an output circuit 104, and a controller 106. The buffer 102 is configured to store a plurality of events. For example, the buffer 102 may be a group of registers or other data storage elements capable of storing events. In an embodiment, each event may be associated with multiple bits. The buffer 102 is configured to receive events 108, store those events and output selected events 112.

The output circuit 104 is configured to output events in the buffer. For example, the output circuit 104 may be configured to output a selected event 112 in the buffer 103 as the output event 114. In particular, the output circuit 104 may be configured to output bits of an event in parallel.

In an embodiment, the output circuit 104 may be configured to output the event 114 to an external device. Thus, the output circuit 104 may be configured to use more power than other internal circuits as the external device may present a larger load than internal circuits.

The controller 106 may include a general purpose processor, a digital signal processor (DSP), an application specific integrated circuit, a programmable logic device, discrete logic devices, or the like. The controller 106 is coupled to the buffer 102 and the output circuit 104 and configured to cause the output circuit 104 to output a first event from the buffer 102. For example, the controller 106 may be configured to cause the buffer 102 to output the first event as event 112. The output circuit 104 may be configured to output the event 112 as the output event 114.

In addition, the controller 106 may be configured to select a second event from the buffer 102 to be output by the output circuit 104 after the first event based on bits associated with the first event. As will be described in further detail below, the selection of the second event may, but need not occur after the output of the first event even though the output of the second event will occur after the output of the first event.

Figure 2:
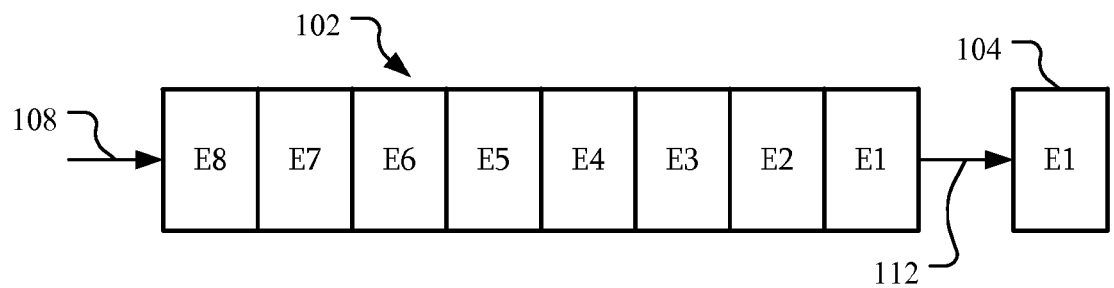
FIGS. 2-5 are schematic views of elements in a buffer and elements to be output according to various embodiments.

FIGS. 2-5 are schematic views of elements in a buffer and elements to be output according to various embodiments. Referring to FIGS. 1 and 2, in this embodiment, the buffer 102 is configured to store eight events E1 to E8. Event E1 is the selected event 112 that is being output by the output circuit 104. After event E1 is output, another event 108 may be stored in the buffer 102 and another event may be selected as the selected event 112.

Figure 3:
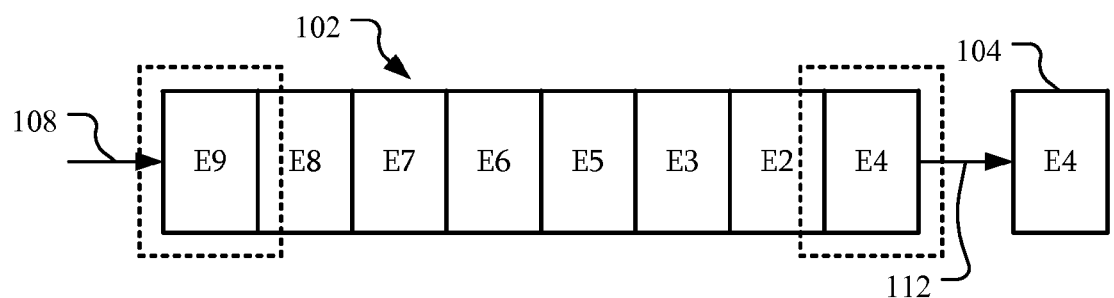

For example, referring to FIGS. 1 and 3, a new event E9 is stored in the buffer 102. However, event E2, the next event in the buffer 102 as illustrated in FIG. 2, was not selected as the next event 112 to be output. In contrast, event E4 was selected as the next event 112. These events E4 and E9 are emphasized with dashed lines for ease of identification. Accordingly, event E4 is now output by the output circuit 104.

In an embodiment, the next event, event E4 in this example, may be selected based on a Hamming distance between the event E1 previously output and the events in the buffer 102. For example, from among events E2 to E8 in the buffer 102 as illustrated in FIG. 2, event E4 may have the smallest Hamming distance to event E1. Accordingly, event E4 is selected to be the next event 112 to be output.

Figure 4:
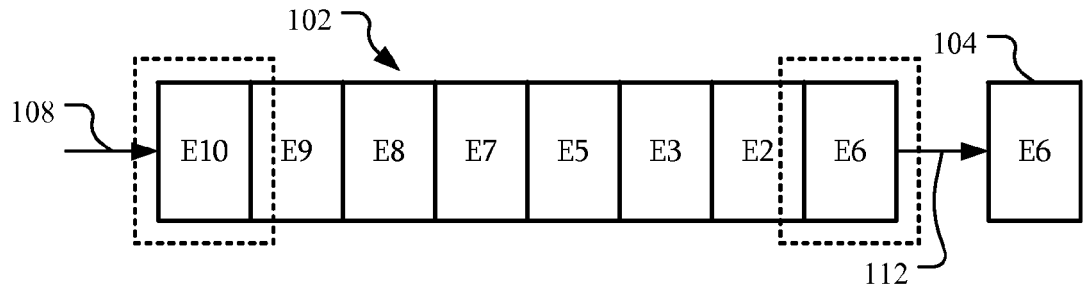

Referring to FIGS. 1 and 4, event E6 is selected as the next event 112 to be output from among the events stored in the buffer 102 of FIG. 3. As the previous event that was output was event E4, the Hamming distance of interest in selecting the next event is now the Hamming distance between event E4 and the other events stored in the buffer 102. Here, event E6 represents the event in the buffer 102 with the minimum Hamming distance to event E4. In addition, a new event E10 has been added to the buffer.

Figure 5:
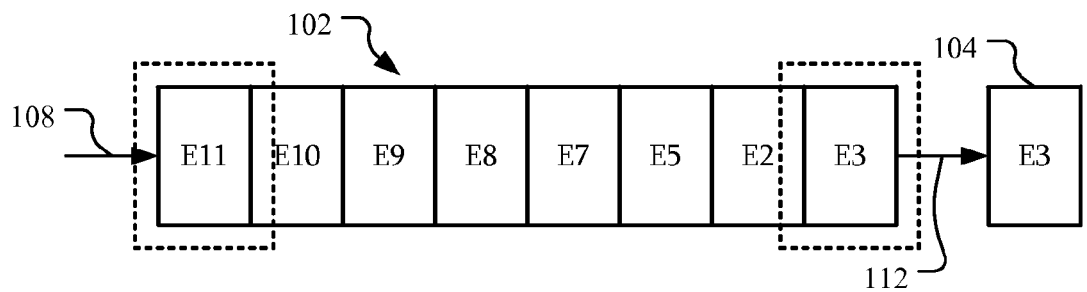

Referring to FIGS. 1 and 5, event E3 has been selected as the next event 112 to be output similar to the other events described above. In addition, event E11 has been stored in the buffer 102. This technique may be repeated such that a new event is continually being stored in the buffer 102 and the next event is selected based on the Hamming distance to the last event output.

In an embodiment, each event may include multiple bits. As the events are output, the output lines of the output circuit 104 transition from the bits of the most recent event to the bits of the next event 112 to be output. By selecting an event with a minimum Hamming distance, a minimum number of transitions may be made when the output transitions to the bits of the new selected event 112. As a result, the number of transitions made may be reduced relative to a first-in-first-out output technique. As the number of transitions may decrease, the power consumption may be reduced. In particular, if the output circuit 104 is configured to drive a larger load as described above, a reduction in transitions may result in a correspondingly larger reduction in power.

Although selecting from among events in the buffer 102 including the event being output has been used as an example, the event 112 to be output may be selected at different stages. For example, after event E9 has been stored in the buffer 102 and event E1 is no longer in the buffer 102, the next event 112 may be selected from among events E2 to E9 currently in the buffer based on the Hamming distance of those events to event E1.

Although using a Hamming distance to determine a next event 112 to be output has been used as an example, the next event 112 may be selected using different techniques. For example, the next event 112 may be selected based on the minimum amount of energy used to output the event. That is, an event in the buffer 102 with a relative minimum amount of energy used to output the event after the previous event may be selected as the next event 112. In another example, a time a given event has been in the buffer may be used to determine if it is the next event 112. In yet another example, periodically, the buffer 102 may be flushed to ensure that events in the buffer, are eventually output.

As illustrated, the buffer 102 is configured to store eight events. However, the depth of the buffer 102 may be any number greater than or equal to two. That is, any depth that allows selection from among two events to be output following a previously output event may be used as the depth of the buffer 102.

Figure 6:
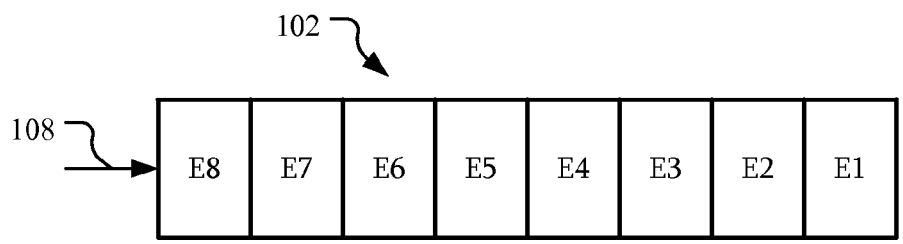
FIGS. 6-7 are schematic views of elements in a buffer according to various embodiments.
Figure 7:
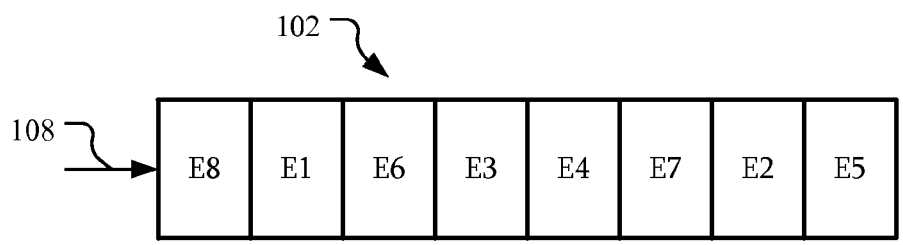

FIGS. 6-7 are schematic views of elements in a buffer according to various embodiments. Referring to FIGS. 6 and 7, in a first state, the buffer 102 may store events E1 to E8. The controller 106 may be configured to order the events in the buffer 102 to be output sequentially. In particular, for any two adjacent events, the order of output of those two events does not affect the number of transitions when switching from one event to the other of the pair; however, the order may affect the number of transitions associated with events before and after the two adjacent events. Thus, an order of the two adjacent events may be selected that will minimize the number of transitions when the two adjacent events are output with other events. The reordering may be expanded to encompass reordering more events, including the events in the entire buffer 102 to minimize the number of transition. FIG. 7 represents an example of reordered events such that when the events are sequentially output in the order illustrated in FIG. 7, the number of transitions is less than if the events were output in the order illustrated in FIG. 6.

In an embodiment, the events of the entire buffer 102 could be output before reordering other events. However, in another embodiment, after an event is output and another event is stored in the buffer 102, part of the buffer 102 or the entire buffer may be reordered to further minimize the number of transitions.

Figure 8:
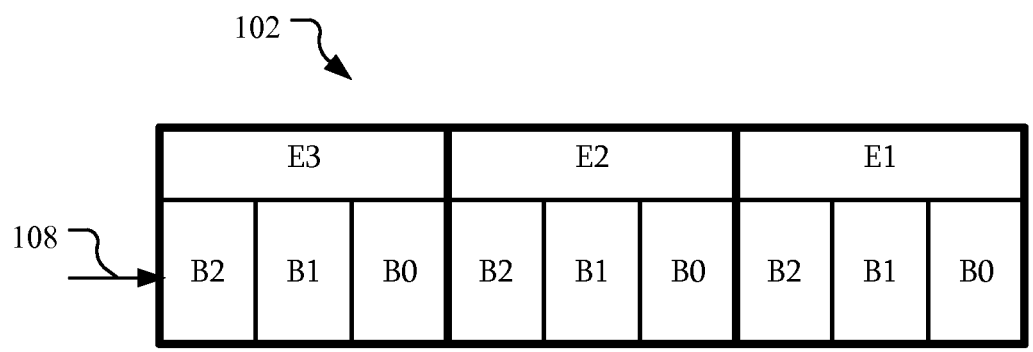
FIG. 8 is a schematic view of events stored in a buffer according to an embodiment.

FIG. 8 is a schematic view of events stored in a buffer according to an embodiment. Referring to FIGS. 1 and 8, in this embodiment, three events E1 to E3 are illustrated as being stored in the buffer 102. Each event includes three bytes B0 to B2. However, in this embodiment, the width of the output circuit 104 may not be sufficient to output an entire event at once. That is, the output circuit 104 may have a width of one byte. Accordingly, a Hamming distance between events may still be used to select the next event to be output; however, that Hamming distance is between the last byte B2 of the previous event and the first byte B0 of the next event to be output. For example, to select between events E2 and E3, the Hamming distance between byte B2 of event E1 and byte B0 of event E2 and the Hamming distance between byte B2 of event E1 and byte B0 of event E3 are calculated. The Hamming distance may be used to select between the events E2 and E3.

Although only three events are illustrated, the three events are only used for clarity. Any number of events may be present. Moreover, although a byte has been used a width of the output circuit 104, the output circuit may have a different width and hence, the bits of the events used to calculate a Hamming distance may be different.

Figure 9:
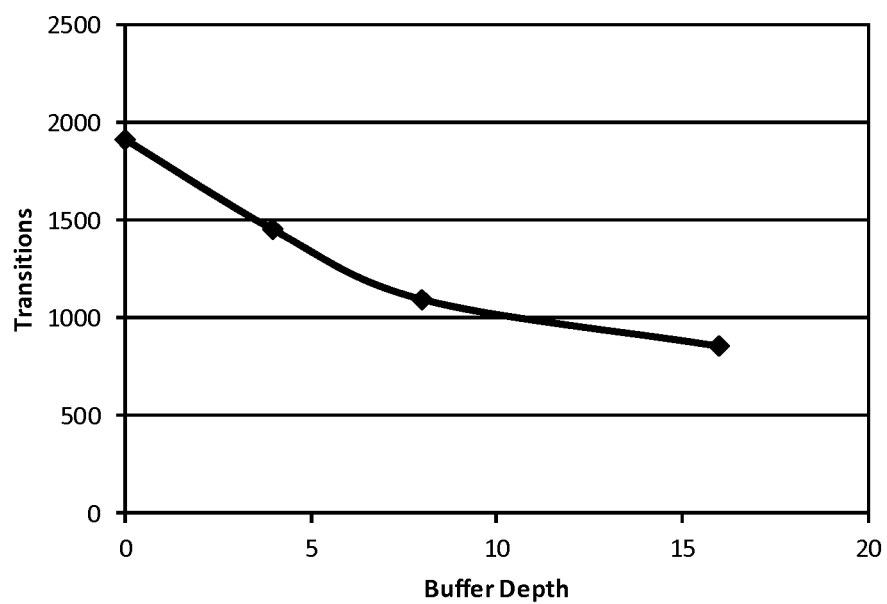
FIG. 9 is a chart of a number of transitions versus buffer depth according to an embodiment.

FIG. 9 is a chart of a number of transitions versus buffer depth according to an embodiment. The table below lists a number of transitions and a reduction in power versus a buffer depth for a particular series of events. As the buffer depth is increased, the number of transitions decreases. The power is correspondingly reduced. Here, a buffer depth of zero represents the output of the events in chronological order.

| Buffer Depth | Transitions | Power Reduction |
| --- | --- | --- |
| 0 | 1914 | 0 |
| 4 | 1450 | 24% |
| 8 | 1094 | 43% |
| 16 | 855 | 55% |

Figure 10:
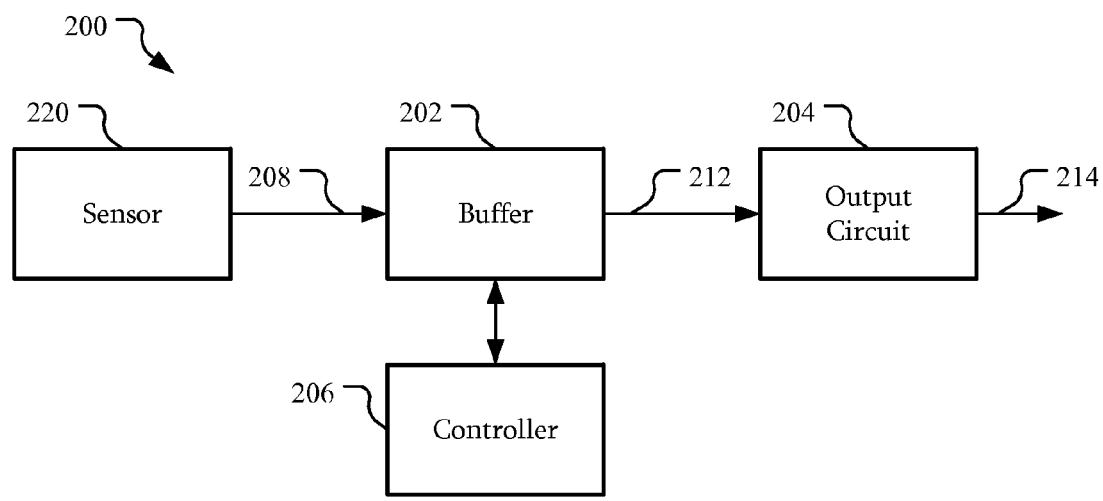
FIG. 10 is a schematic view of an imaging system according to an embodiment.

FIG. 10 is a schematic view of an imaging system according to an embodiment. In this embodiment, the imaging system 200 includes a buffer 202, an output circuit 204, and a controller 206 similar to the buffer 102, output circuit 104, and controller 106 of FIG. 1. However, in this embodiment, the new events 208 are generated by a sensor coupled to the buffer.

In a particular embodiment, the sensor 220 may be a dynamic vision sensor. The sensor 220 may include multiple pixels. Each pixel may be configured to generate an event when a change in the illumination of the pixel reaches a threshold. As a result, the events may be sent out and processed continuously in time and in a frame-less manner. In addition, communication bandwidth to communicate the information is used only by events from active pixels. Highly active pixels may send events more frequently than less active ones.

In an embodiment, each event generated by the sensor 220 may include an address of a pixel of the sensor 220 and a value associated with a change sensed by the pixel. For example, the address may include a row and column of the pixel and a bit representing whether the illumination of the pixel has increased or decreased.

In an embodiment, addresses of pixels of the sensor 220 may be encoded to reduce a Hamming distance between addresses of substantially adjacent pixels. For example, addresses of the pixels of the sensor may be encoded with a gray code. Addresses of adjacent pixels may only differ by one bit. Thus, for events generated by neighboring pixels, a number of transitions when events including the addresses are output may be reduced. In particular, when the system 200 is used in an application that detects motion, a moving object may generate events close to each other, i.e., events on or near the moving object itself.

Although a gray code has been used as an example, other encoding techniques may be used in other embodiments. In particular, any code that may reduce transitions in the events for events that are likely to be output near the same time may be used.

In an embodiment, the system 200 may be configured to operate in an always-on manner. For example, as the sensor 220 may be configured to only output events when a change in illumination greater than a threshold is detected, the operation of the system 200 may already operate at a lower power than a sensor 220 configured to capture images. However, using a system as described herein, the power usage may be even further reduced. Thus, the duration of the standby state or other low-power state during which the system 200 is active may be increased. For example, a mobile device including the system 200 may respond to gestures or other inputs involving the system 200 in a low-power mode and achieve a longer battery life.

Figure 11:
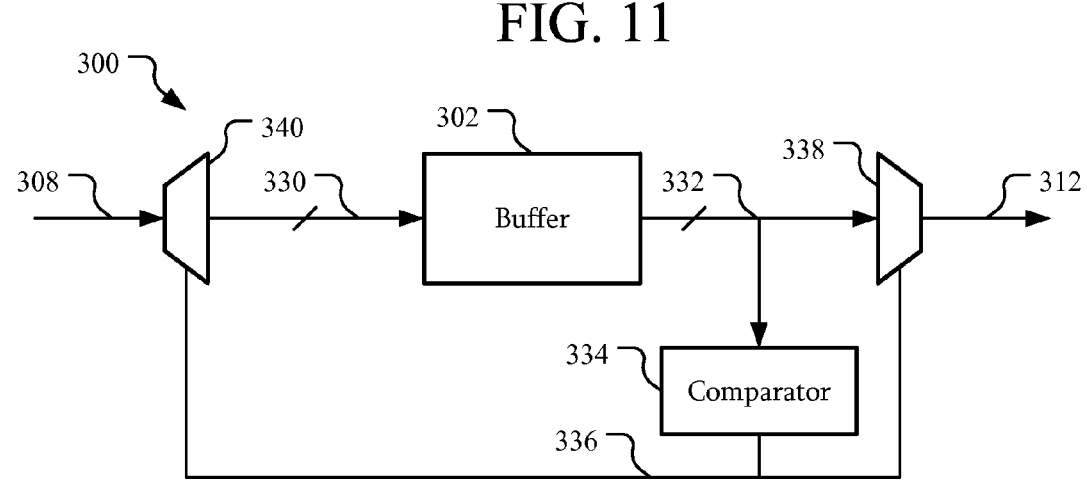
FIGS. 11 and 12 are schematic views of systems according to various embodiments.
Figure 12:
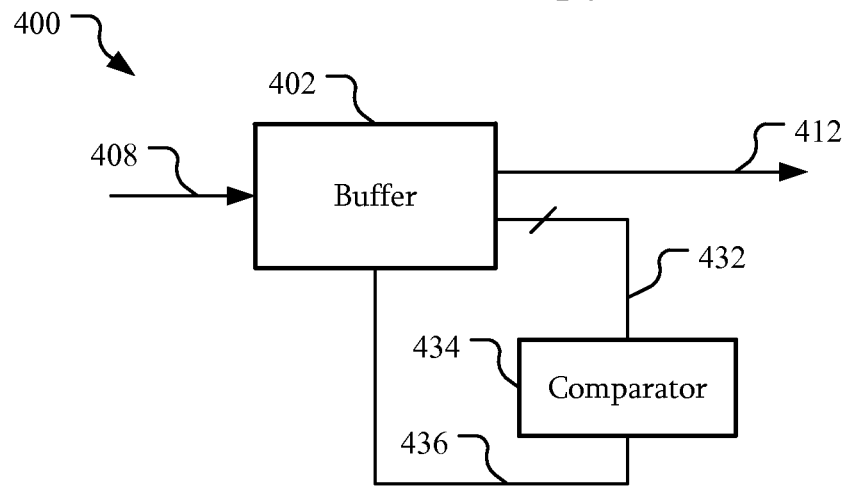

FIGS. 11 and 12 are schematic views of systems according to various embodiments. Referring to FIG. 11, the system 300 includes a buffer 302 and is configured to receive incoming events 308 and output selected events 312. The system includes a comparator 334 configured to compare the events in the buffer 302 to determine an event with a minimum Hamming distance to a previously output event.

In this embodiment, all of the events stored in the buffer 302 may be accessible as the events 332. A multiplexer 338 is configured to select the event 112 to be output from among the events 332 in response to the comparator 334. That is, once the comparator 334 has determined which event of the events 332 should be selected, the comparator 334 is configured to generate a control signal 336 indicating that event. The multiplexer 338 is configured to select the event based on the control signal 336.

Similarly, a demultiplexer 340 may be configured to receive a new event 308. The demultiplexer 340 may be configured to select a location in the buffer 302 represented by inputs 330 to store the new event 308. Just as the event 312 was selected from a location in the buffer 302, that same location may be used as the location for a new event 308. Accordingly, the demultiplexer 340 may be configured to select the location based on the same control signal 336 from the comparator 334.

Referring to FIG. 12, in this embodiment, the system 400 includes a buffer 402 configured to receive new events 408. The buffer 402 is configured to respond to a control signal 436 generated by a comparator 434. The buffer 402 may be configured to select an entry to be output as the entry 412 and shift the entries in the buffer towards the selected entry to make room for the new entry 408 similar to the technique described above with respect to FIGS. 2-5.

The comparator 434 is configured to generate the control signal 436 by comparing the event 412 being output with at least two other events 432 stored in the buffer 402. For example, the comparator 434 may be configured to generate the control signal 436 to select an event in the buffer that has a minimum Hamming distance to the event 412. In the next cycle, the selected event may be used as the output event 412 and the contents of the buffer 402 may be shifted to take the place of that event and allow for storage of the new event 408.

Although some examples of circuits configured to select events from a buffer and store new events in a buffer have been given, other techniques implemented by other circuits may be used in other embodiments. In addition, although some selection techniques have been described, the comparators described above may use different selection techniques as described herein.

Figure 13:
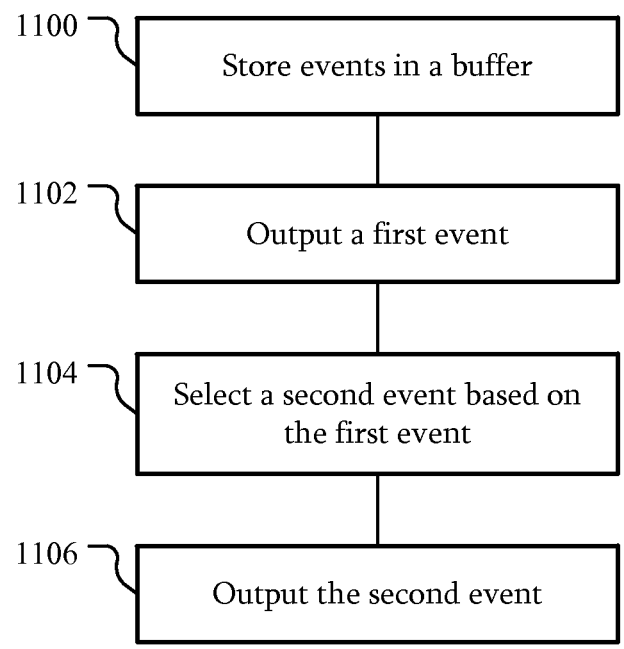
FIGS. 13-15 are flowcharts illustrating techniques of outputting events according to various embodiments.
Figure 14:
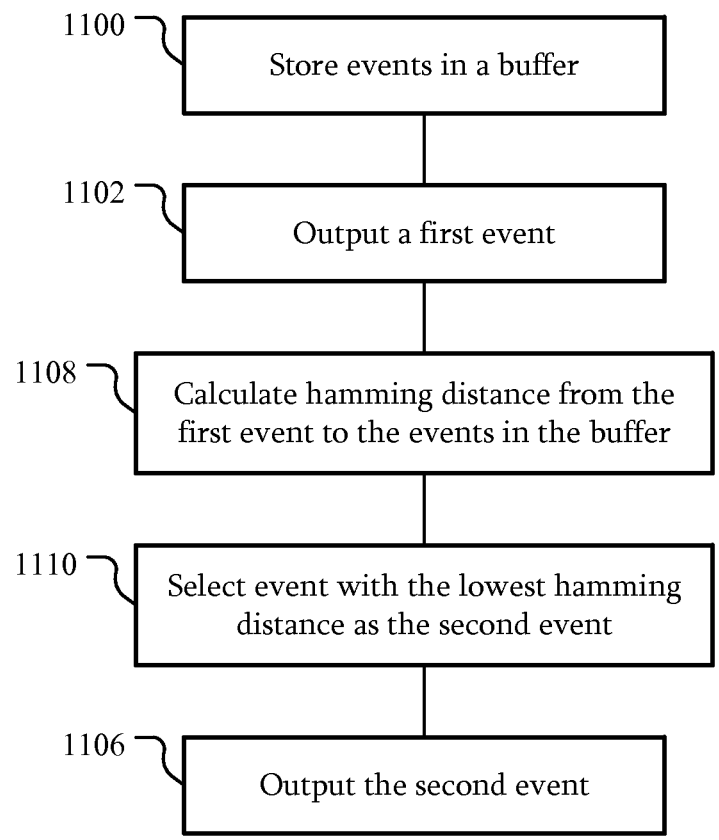
Figure 15:
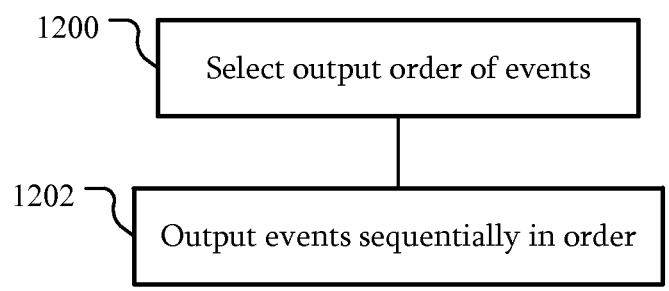

FIGS. 13-15 are flowcharts illustrating techniques of outputting events according to various embodiments. Referring to FIG. 13, in 1100, events are stored in a buffer. As described above, a sensor such as a DVS may generate events, such as by sensing a change to an input of a pixel of the DVS. Those events may be stored in a buffer. A first event of those events may be output in 1102. A second event of the remaining events in the buffer may be selected in 1104. The selection of this event is based on the first event. As described above, a variety of techniques may be used to select this second event. In particular, although the selection is based on the first event, the selection may be based on other events, including an event or events that may be output after the second event. This second event is output in 1106.

In an embodiment, storing the event in the buffer in 1100 may include storing an address of the pixel of a sensor and a value associated with the change in the input to the pixel. In addition, addresses of pixels of the sensor may be encoded to reduce a Hamming distance between addresses of substantially adjacent pixels. Accordingly, not only may the events in the buffer be output in a manner that reduces transitions, but the incoming events may already be encoded such that sequential events may have Hamming distances that are already reduced. Thus, an even further reduction of transitions may be achieved.

Although a particular order has been used as an example, different orders and parallel execution may be used for this technique and others described herein. For example, the storing of events in the buffer in 1100 may be performed substantially continuously, on the occurrence of change in illumination of a pixel of a sensor, or the like, independent of the selection and output of events. Furthermore, the selection of events in 1104 may be part of a selection of an order of events to be output, as described above. The selection may occur before, during, and/or after an event is output in 1102.

Referring to FIG. 14, events may be stored in 1100 and output in 1102 and 1106 as described above. However, in this embodiment, in 1108, a Hamming distance between the first event and events in the buffer is calculated. In 1110, an event with the lowest Hamming distance is selected as the second event to be output in 1106.

Referring to FIG. 15, in 1200 an output order for at least two events in the buffer is selected. The output order is selected such that a number of transitions on output of the at least two events is a minimum. For example, as described above, the events in the buffer may be ordered such that the number of transitions for the sequential output of those events is a minimum. The ordered events may be output in 1202.

Figure 16:
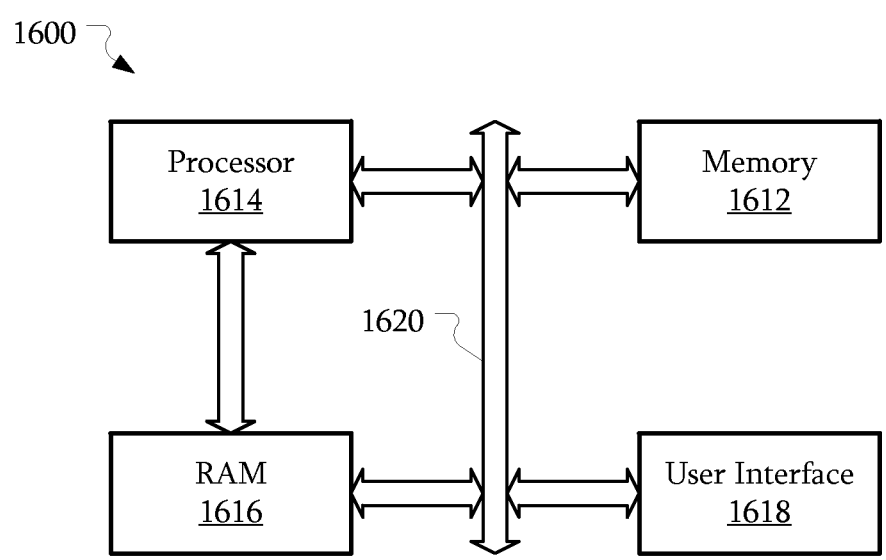
FIG. 16 is a schematic view of an electronic system which may include an output system according to an embodiment.

FIG. 16 is a schematic view of an electronic system which may include an output system according to an embodiment. The electronic system 1600 may be part of a wide variety of electronic devices including, but not limited to portable notebook computers, Ultra-Mobile PCs (UMPC), Tablet PCs, servers, workstations, mobile telecommunication devices, and so on. For example, the electronic system 1600 may include a memory system 1612, a processor 1614, RAM 1616, and a user interface 1618, which may execute data communication using a bus 1620.

The processor 1614 may be a microprocessor or a mobile processor (AP). The processor 1614 may have a processor core (not illustrated) that can include a floating point unit (FPU), an arithmetic logic unit (ALU), a graphics processing unit (GPU), and a digital signal processing core (DSP Core), or any combinations thereof. The processor 1614 may execute the program and control the electronic system 1600. The processor 1614 may be configured to perform some or all of the operations of the various controllers described above.

The RAM 1616 may be used as an operation memory of the processor 1614. Alternatively, the processor 1614 and the RAM 1616 may be packaged in a single package body.

The user interface 1618 may be used in inputting/outputting data to/from the electronic system 1600. For example, the user interface 1618 may include a sensor such as a DVS, or the like as described above. In particular, such a sensor may be part of a gesture recognition system.

The memory system 1612 may store codes for operating the processor 1614, data processed by the processor 1614, or externally input data. The memory system 1612 may include a controller and a memory. The memory system may include an interface to computer readable media. Such computer readable media may store instructions to perform the variety of operations describe above.

Although the methods and systems have been described in accordance with particular embodiments, one of ordinary skill in the art will readily recognize that many variations to the disclosed embodiments are possible, and any variations should therefore be considered to be within the spirit and scope of the methods, and systems disclosed herein. Accordingly, many modifications may be made by one of ordinary skill in the art without departing from the spirit and scope of the appended claims.

The invention claimed is:
1. A system, comprising:
a dynamic vision sensor comprising a plurality of pixels, the dynamic vision sensor generating a plurality of events, each event being based on a pixel of the dynamic vision sensor sensing a change of illumination of the pixel, each pixel having an address, each event sensed by a pixel including a plurality of bits repre- senting an address of the pixel, and each event having a temporal relationship to other events;

a buffer configured to store the plurality of events;

an output circuit configured to output the plurality of bits of each event from the buffer; and a controller coupled to the buffer and the output circuit and configured to:

cause the output circuit to output the bits of a first event from the buffer;

determine a Hamming distance between the bits of the first event and bits of other events in the buffer; and select a second event from the other events in the buffer to be output by the output circuit after the first event such that among the other events, the bits of the second event have a lowest hamming distance to the bits of the first event.

2. The system of claim 1, wherein the dynamic vision sensor is coupled to the buffer and configured to generate the plurality of events to be stored in the buffer.

3. The system of claim 2, wherein the plurality of bits of each event further represent a value associated with a change in illumination sensed by the pixel sensing the event.

4. The system of claim 3, wherein the address of the pixel sensing the event are encoded to reduce a Hamming distance between addresses of substantially adjacent pixels.

5. The system of claim 4, wherein addresses of the pixels of the dynamic vision sensor are encoded using a grey code.

6. The system of claim 1, wherein the controller is configured to select the second event such that output of the second event by the output circuit after output of the first event uses a minimum of energy relative to other events stored in the buffer.

7. The system of claim 1, wherein the buffer has a depth of at least eight events.

8. The system of claim 1, wherein controller comprises:

a comparator configured to compare the first event with at least two events stored in the buffer to determine the second event;

a multiplexer configured to select the second event as the event to be output by the output circuit; and a demultiplexer configured to select a location in the buffer to store a new event in response to the comparator.

9. The system of claim 1, wherein:

the controller comprises a comparator configured to compare the first event with at least two entries stored in the buffer to determine the second event; and the buffer is configured to shift entries of the events in response to the comparator.

10. A system, comprising:

a dynamic vision sensor comprising a plurality of pixels, the dynamic vision sensor generating a plurality of events, each event being based on a pixel of the dynamic vision sensor sensing a change of illumination of the pixel, each pixel having an address, each event sensed by a pixel including a plurality of bits representing an address of the pixel, and each event having a temporal relationship to other events;

a buffer configured to store the plurality of events;

an output circuit configured to output the plurality of events in the buffer; and a controller coupled to the buffer and the output circuit and configured to:

select a first event of the plurality of events stored in the buffer to be output from the output circuit, the first event having a minimum number of bit transitions from a previous event output from the output circuit of the plurality of events stored in the buffer, shift the first event to the output circuit to be output by the output circuit and so that the buffer may receive another event, and select a second event of the plurality of events stored in the buffer to be output from the output circuit, the second event having a minimum number of bit transitions from the first event of the plurality of events stored in the buffer.

11. A method, comprising:

generating a plurality of events by a dynamic vision sensor, the dynamic vision sensor comprising a plurality of pixels, each event being based on a pixel of the dynamic vision sensor sensing a change of illumination of the pixel, each pixel having an address, each event sensed by the pixel including a plurality of bits comprising the address of the pixel, and each event having a temporal relationship to other events;

storing the plurality of events in a buffer;

outputting a first event of the plurality of events stored in the buffer from an output circuit, the first event having a lowest Hamming distance from an event previously output from the output circuit;

storing in the buffer another event generated by the dynamic vision sensor;

selecting a second event of the plurality of events stored in the buffer to be output based on the first event; and outputting the second event from the output circuit;

wherein selecting the second event of the plurality of events stored in the buffer comprises:

determining a Hamming distance between bits of the first event and bits of other events stored in the buffer; and selecting the second event to have a lowest Hamming distance to the bits of the first event.

12. The method of claim 11, wherein the plurality of bits of an event further comprising a value of the change of illumination sensed by the pixel sensing the change of illumination.

13. The method of claim 12, further comprising encoding addresses of pixels of the dynamic vision sensor to reduce a Hamming distance between addresses of substantially adjacent pixels of the dynamic vision sensor.

* * * * *